US012645733B1

(12) United States Patent (10) Patent No.: US 12,645,733 B1
Mysore et al. (45) Date of Patent: Jun. 2, 2026

(54) CONTEXTUAL IMAGE RETRIEVAL

(71) Applicant: Citibank, N.A., New York, NY (US)

(72) Inventors: Vishal Mysore, Mississauga (CA); Sumit Sood, Pune (IN)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/296,843

(22) Filed: Aug. 11, 2025

(51) Int. Cl.
        *G06F 16/56*        (2019.01)
        *G06F 16/51*        (2019.01)
        *G06F 16/53*        (2019.01)

(52) U.S. Cl.
        CPC .............. *G06F 16/56* (2019.01); *G06F 16/51*
                (2019.01); *G06F 16/53* (2019.01)

(58) Field of Classification Search
        CPC ........... G06F 16/56; G06F 16/51; G06F 16/53
        See application file for complete search history.

(56) References Cited

U.S. PATENT DOCUMENTS

| | | | | |
|---|---|---|---|---|
| 12,430,344 | B1 * | 9/2025 | Standerfer | ........ G06F 16/24578 |
| 2020/0104721 | A1 * | 4/2020 | Mori | .................... G06V 10/454 |
| 2021/0264203 | A1 * | 8/2021 | Fuxman | .................. G06F 18/24 |
| 2023/0306087 | A1 * | 9/2023 | Krishnan | .............. G06F 16/583 |
| 2024/0354333 | A1 * | 10/2024 | Dolev | ..................... G06F 16/53 |
| 2025/0231975 | A1 * | 7/2025 | DeGroot | ................ G06Q 50/08 |
| 2025/0298840 | A1 * | 9/2025 | Gong | .................... G06F 16/538 |
| 2025/0307245 | A1 * | 10/2025 | Haynes | ............... G06F 16/3347 |
| 2025/0308156 | A1 * | 10/2025 | Milacski | ................. G06T 17/00 |
| 2025/0308268 | A1 * | 10/2025 | Madhumani | ........... G06V 10/26 |

OTHER PUBLICATIONS

Bojanowski, et al., "Self-Supervised Vision Transformers with DINO," Github repository (retrieved Sep. 12, 2025 at <https://github.com/facebookresearch/dino),> 8 pages.
Pinecone website homepage, retrieved Sep. 12, 2025 from https://www.pinecone.io/, 8 pages.
Radford, et al., "CLIP: Connecting Text and Images," <https://openai.com/index/clip/> (retrieved Sep. 12, 2025), Jan. 5, 2021, 21 pages.
Weaviate website homepage, retreived Sep. 12, 2025 from <https://weaviate.io/,> 7 pages.
Wikipedia, "FAISS," retrieved Sep. 12, 2025 from <https://en.wikipedia.org/wiki/FAISS> [last edited Sep. 4, 2025], 5 pages.

* cited by examiner

*Primary Examiner* — Bobbak Safaipour
(74) *Attorney, Agent, or Firm* — Davis Wright Tremaine LLP

(57) ABSTRACT

Techniques and systems described herein relate to data storage and contextual retrieval of images in a database. In one example, an image is stored along with a unique vector embedding to a database. The image can then be retrieved based on a similarity between an input query and the image or the unique vector embedding.

20 Claims, 11 Drawing Sheets

400
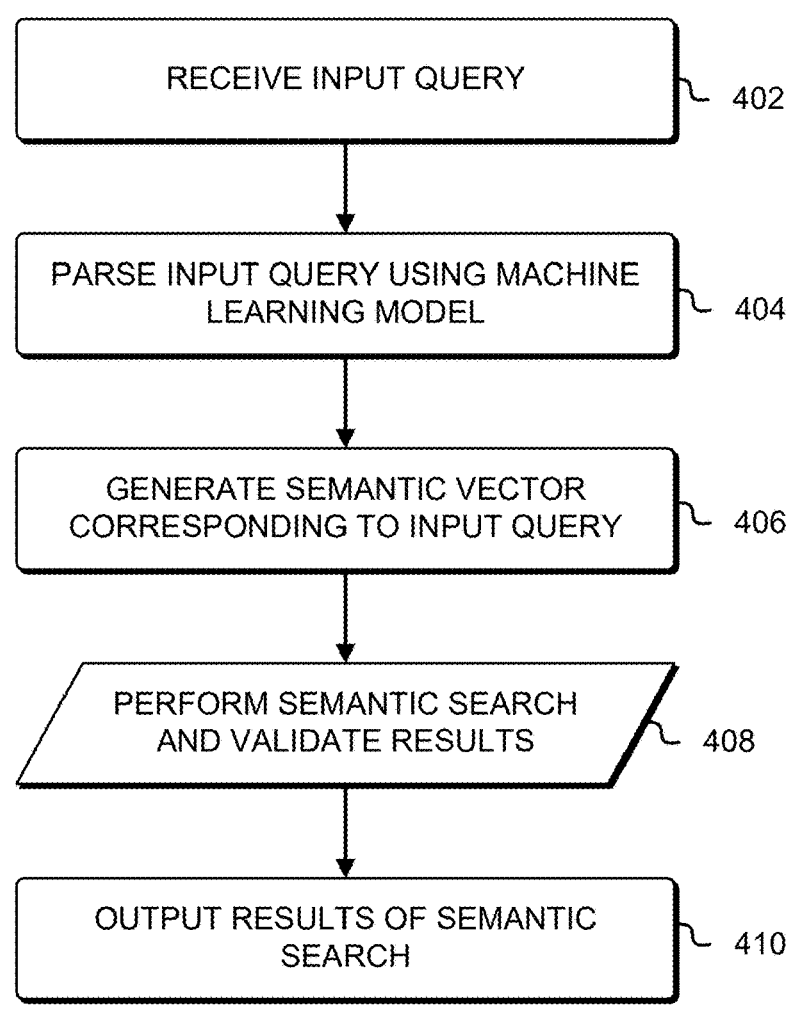
RECEIVE INPUT QUERY — 402
PARSE INPUT QUERY USING MACHINE LEARNING MODEL — 404
GENERATE SEMANTIC VECTOR CORRESPONDING TO INPUT QUERY — 406
PERFORM SEMANTIC SEARCH AND VALIDATE RESULTS — 408
OUTPUT RESULTS OF SEMANTIC SEARCH — 410
FIG. 4

500

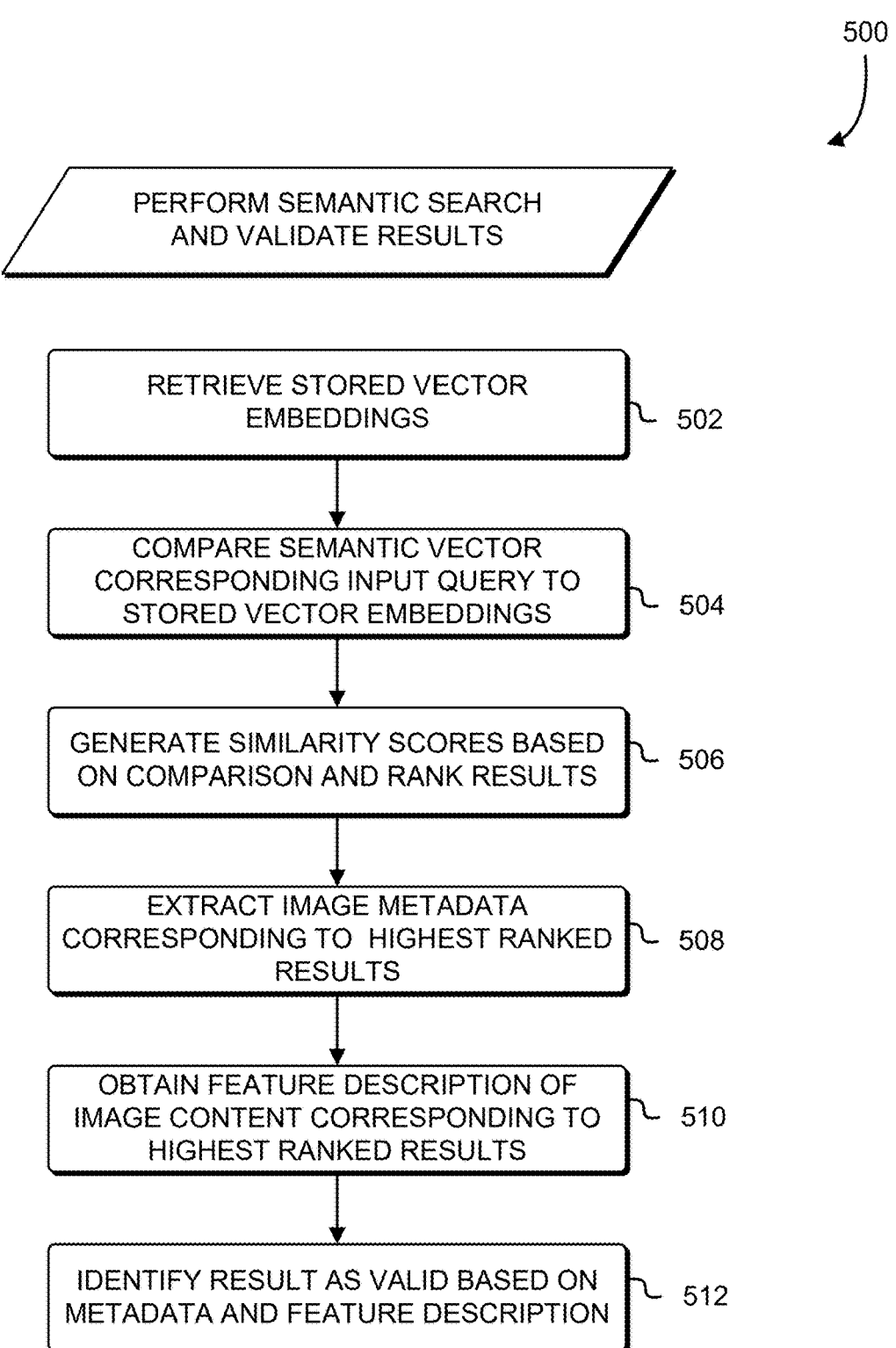

PERFORM SEMANTIC SEARCH
AND VALIDATE RESULTS

RETRIEVE STORED VECTOR
EMBEDDINGS                                    502

COMPARE SEMANTIC VECTOR
CORRESPONDING INPUT QUERY TO
STORED VECTOR EMBEDDINGS                       504

GENERATE SIMILARITY SCORES BASED
ON COMPARISON AND RANK RESULTS                506

EXTRACT IMAGE METADATA
CORRESPONDING TO  HIGHEST RANKED              508
RESULTS

OBTAIN FEATURE DESCRIPTION OF
IMAGE CONTENT CORRESPONDING TO                510
HIGHEST RANKED RESULTS

IDENTIFY RESULT AS VALID BASED ON
METADATA AND FEATURE DESCRIPTION              512

FIG. 5

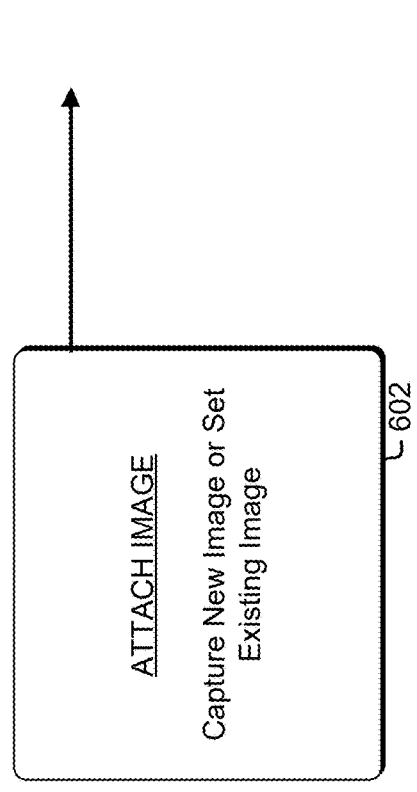
ATTACH IMAGE
Capture New Image or Set Existing Image
602
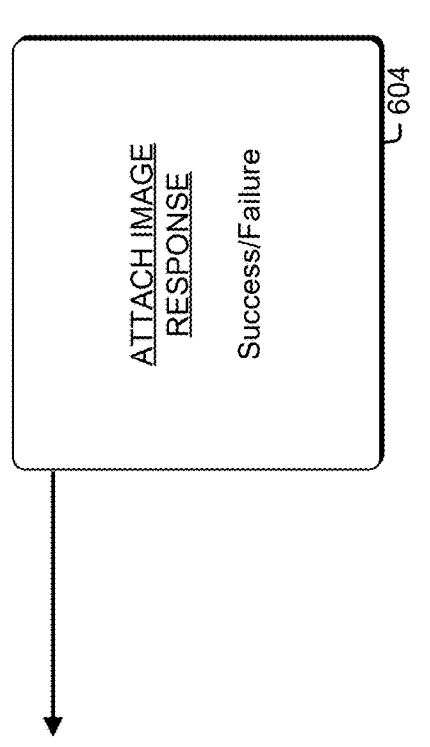
ATTACH IMAGE RESPONSE
Success/Failure
604
FIG. 6

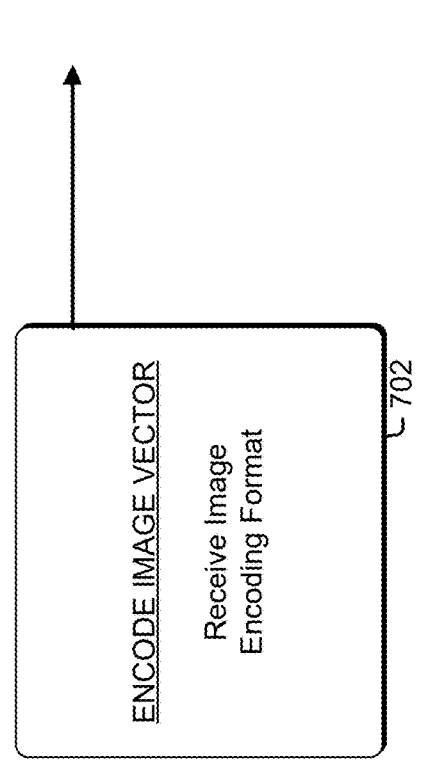
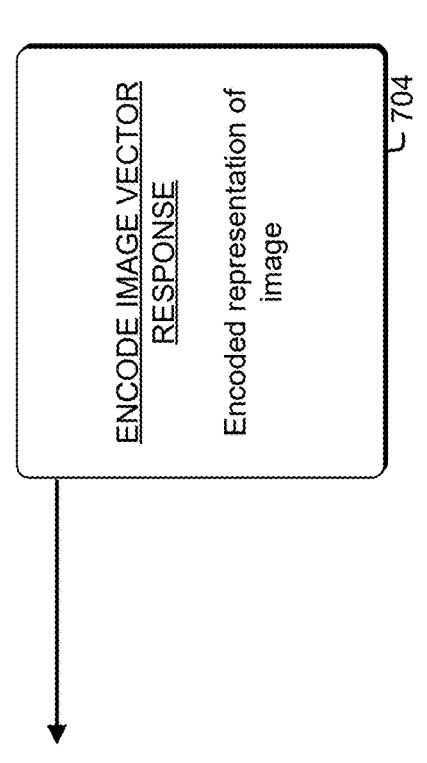
ENCODE IMAGE VECTOR
Receive Image
Encoding Format
702
ENCODE IMAGE VECTOR RESPONSE
Encoded representation of image
704
FIG. 7

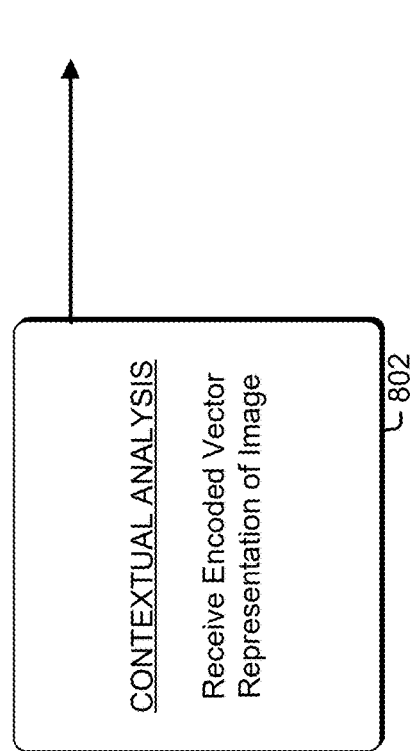
CONTEXTUAL ANALYSIS
Receive Encoded Vector Representation of Image
802
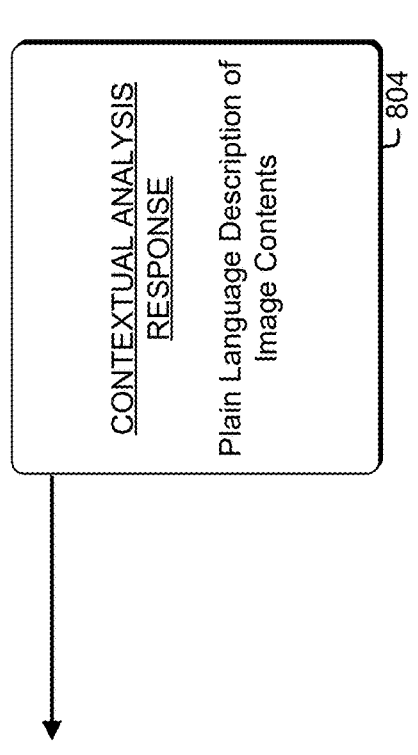
CONTEXTUAL ANALYSIS RESPONSE
Plain Language Description of Image Contents
804
FIG. 8

900
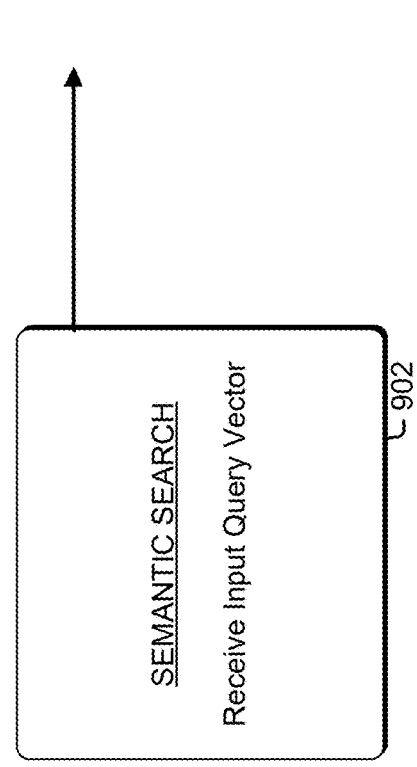
SEMANTIC SEARCH
Receive Input Query Vector
902
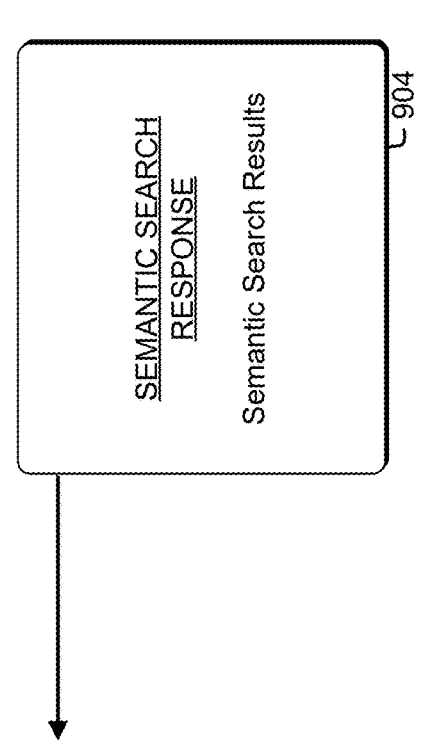
SEMANTIC SEARCH
RESPONSE
Semantic Search Results
904
FIG. 9

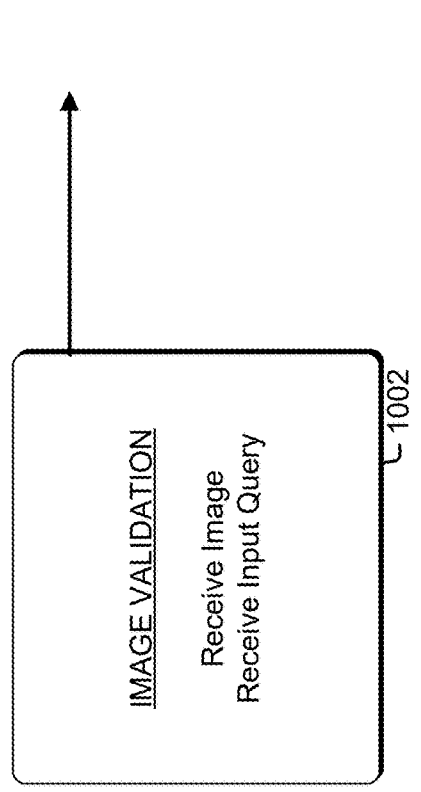
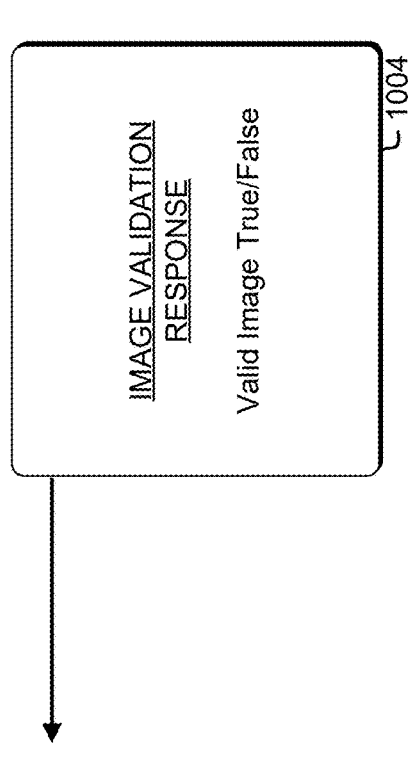
IMAGE VALIDATION
Receive Image
Receive Input Query
1002
IMAGE VALIDATION RESPONSE
Valid Image True/False
1004
FIG. 10

CONTEXTUAL IMAGE RETRIEVAL

BACKGROUND

Identifying and retrieving a specific image from a large database with a large amount of other screenshots is an arduous and inefficient process. For example, if a specific screenshot of an application window is needed by a user, a person would have to manually examine each screenshot in the database to find the correct one, which could be impractically time-consuming and error prone.

BRIEF DESCRIPTION OF THE DRAWINGS

Various techniques will be described with reference to the drawings, in which:

FIG. 4 is a flowchart that illustrates an example of retrieving data captured in a contextual image retrieval system in accordance with an embodiment;

FIG. 5 is a flowchart that illustrates an example of semantic search and validation used with data retrieval in a contextual image retrieval system in accordance with an embodiment;

FIG. 6 illustrates a block diagram of an application programming interface (API) that includes an instruction call and an instruction response to attach an image for semantic processing, in accordance with at least one embodiment;

FIG. 7 illustrates a block diagram of an application programming interface (API) that includes an instruction call and an instruction response to encode a vector representation of an image, in accordance with at least one embodiment;

FIG. 8 illustrates a block diagram of an application programming interface (API) that includes an instruction call and an instruction response to identify context and content of objects found in a captured image, in accordance with at least one embodiment;

FIG. 9 illustrates a block diagram of an application programming interface (API) that includes an instruction call and an instruction response to perform a semantic search of an image database, in accordance with at least one embodiment;

FIG. 10 illustrates a block diagram of an application programming interface (API) that includes an instruction call and an instruction response to perform image validation, in accordance with at least one embodiment.

DETAILED DESCRIPTION

Figure 1:
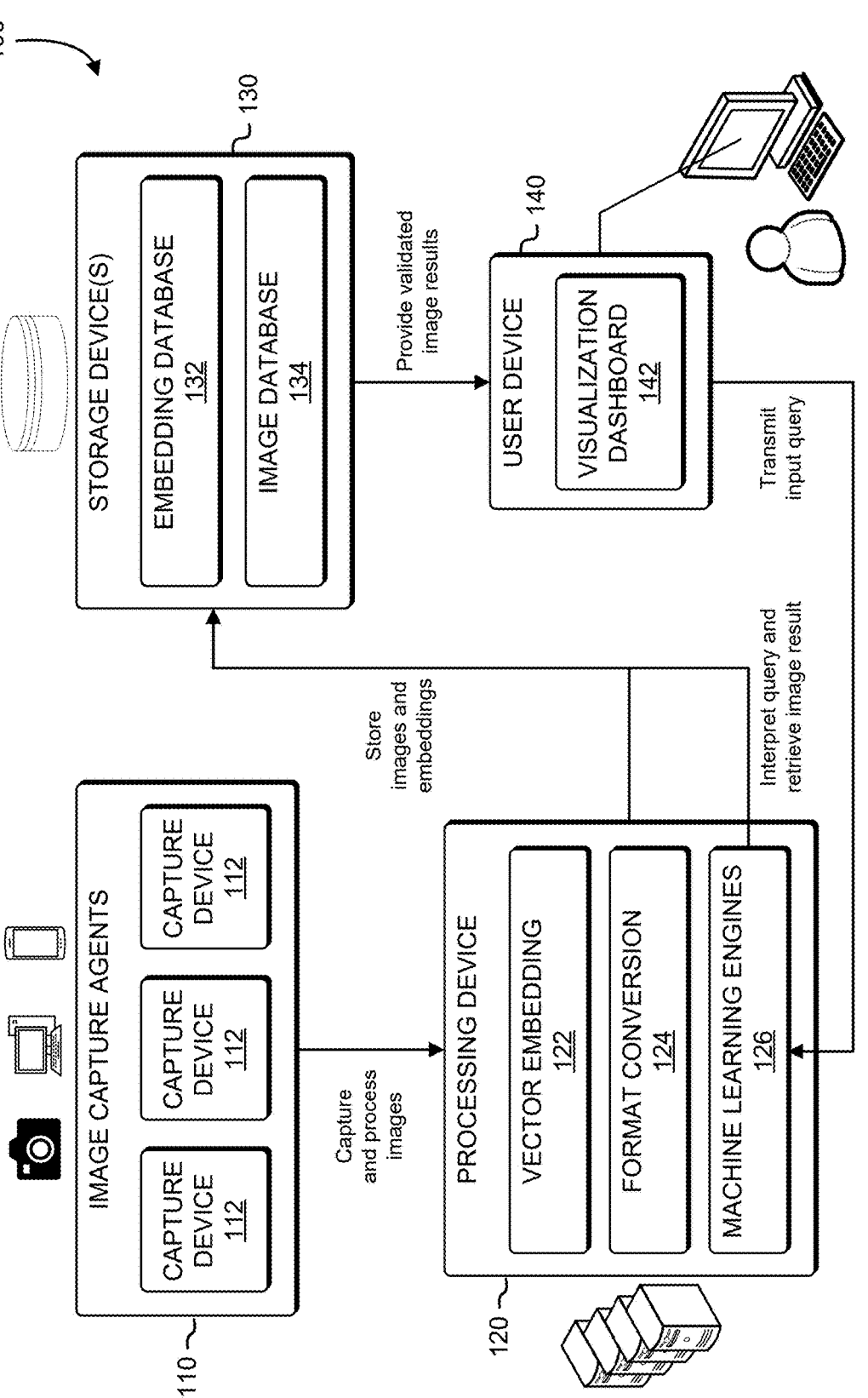
FIG. 1 illustrates an example of a contextual image retrieval system in accordance with an embodiment.

Techniques and systems described below relate to data storage and contextual retrieval of images in a database. In one example, devices or systems embedded with image-capturing capabilities (e.g., mobile phones, Internet-of-Things (IOT) cameras, surveillance cameras, digital cameras, single lens reflex cameras, computing devices capable of generating images or screenshots, etc.) capture images of a scene or computing environment. A processing device using a machine learning model (e.g., a vision transformer, OpenAI CLIP, Facebook DINO, or other machine learning models capable of processing images) encodes the captured images into vector representations and generates unique vector embeddings for each captured image, which are stored on a database or central repository.

One or more an image capture agent captures an image of a scene or a screenshot of a display screen and transmits the image to a database. The image captured by an image capture agent may be a two-dimensional image comprising pixels representing the captured scene or the screenshot representing the software display. After a captured image is stored in the database, a user can then retrieve the captured image using a natural language query (e.g., "Find images or screenshots captured on date X that include a road sign."). In one example, a user inputs the natural language query to a processing system that converts the query into a vector embedded representation using a machine learning model (e.g., a natural language processing (NLP) engine, large language model (LLM), ChatGPT, etc.). The processing system then compares this vector embedded representation to the vector embeddings and vector representations stored in the database to generate a semantic similarity score, indicating a probability that a given image in the database is a result to the query. The results with the highest probabilities are then validated to determine whether the image is a correct result using various techniques (e.g., evaluating image metadata, performing optical character recognition (OCR), feature matching, identifying objects, content, and/or context of the captured images, and/or other known image processing techniques to identify image characteristics). The validated results may then be returned to the user.

By implementing the processing system described in the example embodiments herein, a user is able to perform accurate, efficient, and scalable image retrieval and automated validation by leveraging vector embedding and natural language processing.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of digital forensics, anomaly identification, or regulatory reporting compliance, by quickly classifying, identifying, and/or retrieving images or screenshots of a computing system that can prove or preserve information for later inspection or investigation. Techniques described additionally improve current inefficiencies caused by manual error in image classification and sorting. Additionally, techniques described and suggested in the present disclosure improve the efficiency of imaging database systems by allowing real-time monitoring of images input to the database and notifying a user of a captured event as the image is transmitted and processed at the repository. Moreover, techniques described and suggested in the present disclosure are necessarily rooted in computer technology in order to overcome problems specifically arising with the arduous process of manual validation of image content by enabling a machine learning model to identify in an automated fashion.

FIG. 1 illustrates a contextual image retrieval system 100 in accordance with an example embodiment of the present disclosure. As depicted in FIG. 1, contextual image retrieval system 100 may include several interconnected components that work together to capture, process, store, and retrieve images, such as image capture agents 110 equipped with one or more image capture device 112 responsible for capturing images in real-time. These images may be sent to a processing device 120, which may utilize a vector embedding unit 122 to generate vector embeddings representing the semantic content of the images. The processing device 120 may also include a format conversion unit 124 and/or machine learning engine 126 to convert and process the images further. The processed images and their embeddings may be stored in storage device(s) 130, which may comprise an embedding database 132 and an image database 134. Users may interact with the contextual image retrieval system 100 via a user device 140, which may display a visualization dashboard 142 for querying and retrieving images based on their semantic content.

In an example embodiment, contextual image retrieval system 100 causes a computing system to receive one or more images captured by an image capture agent, generate one or more vectors corresponding to the one or more images, and record the one or more images and the one or more vectors in a database. The one or more images may be captured and processed in real-time in response to a trigger caused either manually by a user or automatically through software or a service that triggers when a condition is satisfied (e.g., image capture of a road when a car is detected in the scene). In some examples, "real-time" may refer to the capability of the system to process and handle the data, without significant delay. For example, the images may be captured by autonomous image capture agents, processed, converted into base64 format, and vector embeddings generated within seconds. These processed images may then be sent to a central repository where they can be validated and retrieved based on user queries. In some embodiments, the system is designed to handle these operations quickly enough to be considered real-time, which is important for implementations that rely on prompt feedback or action, such as compliance checks or anomaly detection in security systems. However, it is contemplated that there may be slight delays depending on the complexity of the task and the system's configuration, especially in high-traffic environments where network latency may be present. The one or more images may also be captured and processed outside of real-time, where images may be captured and buffered throughout the day but the images are not processed until a later time, such as in daily batch processing, to conserve computing resources. Contextual image retrieval system 100 may additionally receive an input query to locate or identify an image stored in the database by identifying a similarity between a vector corresponding to the input query to a vector corresponding to an image stored in the database.

Contextual image retrieval system 100 may utilize autonomous image capture agents deployed across various locations, process images in real time, convert the images to base64, generates vector embeddings, and send the original images, vector embeddings, and/or base64 representations of the images to a central repository for validation, the images can then be viewed and linked on various visualization dashboards. Contextual image retrieval system 100 may enable efficient searching and verification of images through natural language queries.

As illustrated in FIG. 1, the contextual image retrieval system 100 may include image capture agents 110 controlling and/or including one or more capture devices 112. The image capture agents 110 may be a hardware or a software program performed by a processor that causes or otherwise controls the one or more capture devices 112 to capture an image of a scene. The image capture agents 110 may cause the one or more capture devices 112 to capture periodically at predetermined time intervals, in response to a trigger event such as detection of an object in the capture scene, or in response to a manual trigger. Capture devices 112 may be any device that captures an image, such as a digital camera, a computing device, a mobile device, IoT camera, medical imaging devices, document scanners, or other known devices that capture an image.

In one example embodiment, image capture agents 110 are a plurality of software programs running in the background of a user computing device, such as a desktop computer, laptop computer, or a tablet. Each software program may have a screenshot function that serves as a capture device 112 that is capable of capturing a screenshot of a current display screen in real time. Each capture device 112 may be designated to capture different portions or various interface elements of the computing system in response to a same or a different triggers. For example, all capture devices 112 may capture a screenshot in response to a manual trigger, but only some capture devices 112 may capture a screenshot in response to an event trigger, such as clicking a specific user interface element, entering information in a text box, or moving to another menu screen. The images captured by the capture devices 112 may be aggregated by the image capture agents 110 and transmitted together for storage along with metadata that indicates date, time, location, which capture device or image capture agent captured the image, other images captured by other agents that may be related, and/or other known metadata useful for classification.

Contextual image retrieval system 100 may also include a processing device 120. Processing device 120 may be a processor, such as a central processing unit (CPU), graphics processing unit (GPU), a general-purpose GPU (GPGPU), parallel processing unit (PPU), a data processing unit (DPU), a system-on-chip (SoC), and/or other types of processors. The processing device 120 may also include a plurality of fixed function accelerators (FFA), domain-specific accelerators, specialized processors, single-purpose processors, application-specific processors, and/or other types of processors designated to perform a specific task, such as image processing. Processing device 120 may be a part of the same computing system or device having the image capture agents 110. Processing device 120 may be a remote server, computing system, or device that is connected to the image capture agents 110 through a local area network (LAN), a wide area network (WAN), a wired network, a wireless network, or the Internet. The processing device 120 may further comprise a vector embedding unit 122, format conversion unit 124, and machine learning engines 126. Machine learning engines 126 may comprise a plurality of different machine learning models to be used by different units of the processing device 120.

Images captured by image capture agents 110 may be transmitted from the capture devices 112 to processing device 120. At the processing device 120, the images may then be received by a vector embedding unit 122 to generate data representative of the captured images in a continuous vector space. For example, vector embedding unit 122 may divide the images into discrete patches or tokens and convert the patches or tokens into numerical vectors. Each vector encodes semantic information or properties relative to the images that can be used for later retrieval.

The numerical vectors generated by vector embedding unit 122 may then be input to format conversion unit 124 to convert or encode the numerical vectors to a different or specific format. For example, format conversion unit 124 may encode the numerical vectors from vector embedding unit 122 into a base64 or other database-friendly format. The format conversion unit 124 may include any combination of software, hardware, firmware, and/or circuitry arranged to perform the function described. The format conversion unit 124 may include one or more circuits that form part of a larger system (e.g., an integrated circuit (IC), system on-chip (SoC), central processing unit (CPU), graphics processing unit (GPU), data processing unit (DPU), etc.). Software for the format conversion unit 124 may include software packages, code, programming language, drivers, instructions, instruction sets, or some combination thereof. Hardware for the format conversion unit 124 may include hardwired circuits, programmable circuits, state machine circuits, fixed function circuits, execution unit circuits, firmware with stored instructions executed by programmable circuits, or some combination thereof.

The vectors generated by the vector embedding unit 122 and the encoded vectors from the format conversion unit 124 may be generated using machine learning engines 126. The vector embedding unit 122 may include any combination of software, hardware, firmware, and/or circuitry arranged to perform the function(s) described herein. The vector embedding unit 122 may include one or more circuits that form part of a larger system (e.g., an integrated circuit (IC), system on-chip (SoC), central processing unit (CPU), graphics processing unit (GPU), data processing unit (DPU), etc.). Software for the vector embedding unit 122 may include software packages, code, programming language, drivers, instructions, instruction sets, or some combination thereof. Hardware for the vector embedding unit 122 may include hardwired circuits, programmable circuits, state machine circuits, fixed function circuits, execution unit circuits, firmware with stored instructions executed by programmable circuits, or some combination thereof. Vector embedding unit 122 may utilize a machine learning model of the machine learning engines 126, such as a vision transformer (ViT), a language-image model that performs imaging tasks in conjunction with textual semantic learning (e.g., OpenAI CLIP), a self-supervised vision model that performs vision transformer tasks with self-attention (e.g., Facebook DINO), a residual network (ResNet), DenseNet (Densely Connected Convolutional Networks), U-Net, AlexNet, VGGNet, or other known machine learning model capable of generating vector embeddings from the image. In another example, format conversion unit 124 may be generated using an autoencoder, a generative adversarial network (GAN), recurrent neural network (RNN), or other known machine learning model capable of converting a vector to another format.

The machine learning models of machine learning engines 126 may be trained through reinforcement learning, supervised learning, unsupervised learning, semi-supervised learning, self-supervised learning, transfer learning, or other known methods of training machine learning models. The machine learning models of machine learning engines 126 may also utilize historical information of previous queries, previous responses, and/or other user interactions to continually learn from the environment in which the models are employed. For example, if this contextual image retrieval system 100 is used in conjunction with a surveillance system, then the machine learning engines 126 may be continually trained to respond with greater weight to security-based events or queries, such as those related to intrusion detection or facial recognition. In another example, if this contextual image retrieval system 100 is used in conjunction with a banking system, then the machine learning model 126 may be continually trained to respond with greater weight to finance-based events or queries, such as those related to regulatory compliance or financial forensics.

Contextual image retrieval system 100 may also include storage device(s) 130. Storage device(s) 130 may comprise one or more hard disk drives (HDDs), solid state drive (SSDs), storage databases, cloud storage, network attached storage, optical storage, flash storage, and/or other known types of storage devices. Storage device(s) 130 may be a part of the same computing system or device having the image capture agents 110 or processing device 120. Storage device (s) 130 may additionally be a part of a remote server, computing system, or device that is connected to the image capture agents 110 and/or processing device 120 through a local area network (LAN), a wide area network (WAN), a wired network, a wireless network, or the Internet.

After the images have been processed by vector embedding unit 122 and format conversion unit 124, one or more of the captured images generated by image capture agents 110, the numerical vectors generated by the vector embedding unit 122, and/or the encoded vectors generated by the format conversion unit 124 are transmitted to and stored in a storage device(s) 130 for later retrieval by a user or other connected system.

Storage device(s) 130 may comprise a plurality of databases, such as an embedding database 132 and an image database 134. In an example embodiment, the images generated by image capture agents 110 and transmitted from processing device 120 are stored in image database 134. Additionally, the numerical vectors generated by the vector embedding unit 122, and/or the encoded vectors generated by the format conversion unit 124 are transmitted from processing device 120 to and stored in an embedding database 132. In an example embodiment, embedding database 132 is a high-performance vector database, such as Facebook AI Similarity Search (FAISS), Pinecone, Weaviate, and/or other known vector databases, that serves as a central repository that stores image vector embeddings. In some examples, the embedding database 132 and/or image database 134 may be distributed database(s). It is contemplated that embedding database 132 and image database 134 may be stored on separate storage devices(s) 130.

Contextual image retrieval system 100 may also include user device 140. User device 140 may be a computing device, such as a desktop computer, laptop computer, tablet, mobile phone, and/or other computing device. User device 140 may comprise a display or screen, such as a liquid crystal display (LCD), light emitting diode (LED) display, organic light emitting diode (OLED) display, and/or other known display in which software data, such as a visualization dashboard 142, user interface, and/or images may be displayed to a user. Visualization dashboard 142 may comprise a user interface specific to a task in which text, data, and/or images requested by a user may be shown to that user. User device 140 may be a device directly connected to image capture agents 110, processing device 120, and/or storage device(s) 130. User device 140 may be a device that is remotely connected to image capture agents 110, processing device 120, and/or storage device(s) 130 through a network, such as the internet.

When a user wants to find or request retrieval of data, such as images or contextual information stored in the storage device(s) 130, a user may input a natural language input query at user device 140 related to the image. For example, a user may enter an input query "Retrieve all transaction screenshots from the last week involving account #98765 with timestamp #2023-02-15" so that any images or relevant data that satisfy that query will be retrieved by the contextual image retrieval system 100 automatically.

After the user inputs the query at the user device 140, the input query may then be transmitted to processing device 120. In an example embodiment, processing device 120 may use a machine learning model of machine learning engines 126 to parse the user query. For example, processing device 120 may use a natural language processing (NLP) engine to interpret and process human language. The NLP may comprise a large language model (LLM), transformer neural network, generative pre-trained transformer network, sequence-to-sequence models, recurrent neural network, and/or other type of machine learning model for natural language processing.

Using an NLP engine of machine learning engines 126, the input query may be parsed into a vector embedding, extracting relevant entities and semantic content of the input query. For example, using the earlier input query "Retrieve all transaction screenshots from the last week involving account #98765 with timestamp #2023-02-15," the NLP engine would extract relevant semantic content, including the date range, account number, timestamp, and transaction.

Processing device 120 then performs a semantic comparison between the vectors generated by the NLP engine and the vectors stored in embedding database 132. The vectors of the input query is compared with vectors of the images using cosine similarity or approximate nearest neighbor search techniques.

Processing device 120 retrieves the most relevant images based on similarity scores and contextual relevance to the query based on the similarity between the semantic information of the input query and the contextual information of the images. When relevant images or screenshots are retrieved, the contextual image retrieval system 100 validates the content of the retrieved images by verifying metadata such as identifiers (IDs), timestamps, and/or other relevant details using AI-based content recognition, Optical Character Recognition (OCR), and/or object detection, to ensure that the retrieved images align with the input query parameters.

Contextual image retrieval system 100 be performed by a computing device, such as computing device 1100, processors 1102 or any suitable device. In at least one embodiment, a processor of contextual image retrieval system 100 can at least partially perform workflows or processes described with reference to FIG. 2-11. In at least one embodiment, a contextual image retrieval system 100 performs receive one or more images captured in real-time by autonomous image capture agents deployed to various locations across a distributed computing system; generate, using one or more first machine learning (ML) models, one or more vectors that embed one or more base64 representations of the one or more images, the one or more vectors representing semantic content of the one or more images in numerical form, generate, by providing the one or more images to one or more second ML models, one or more natural language descriptions of one or more objects in the one or more images; and record, in a vector database, the one or more vectors with the one or more natural language descriptions of the one or more images.

Figure 2:
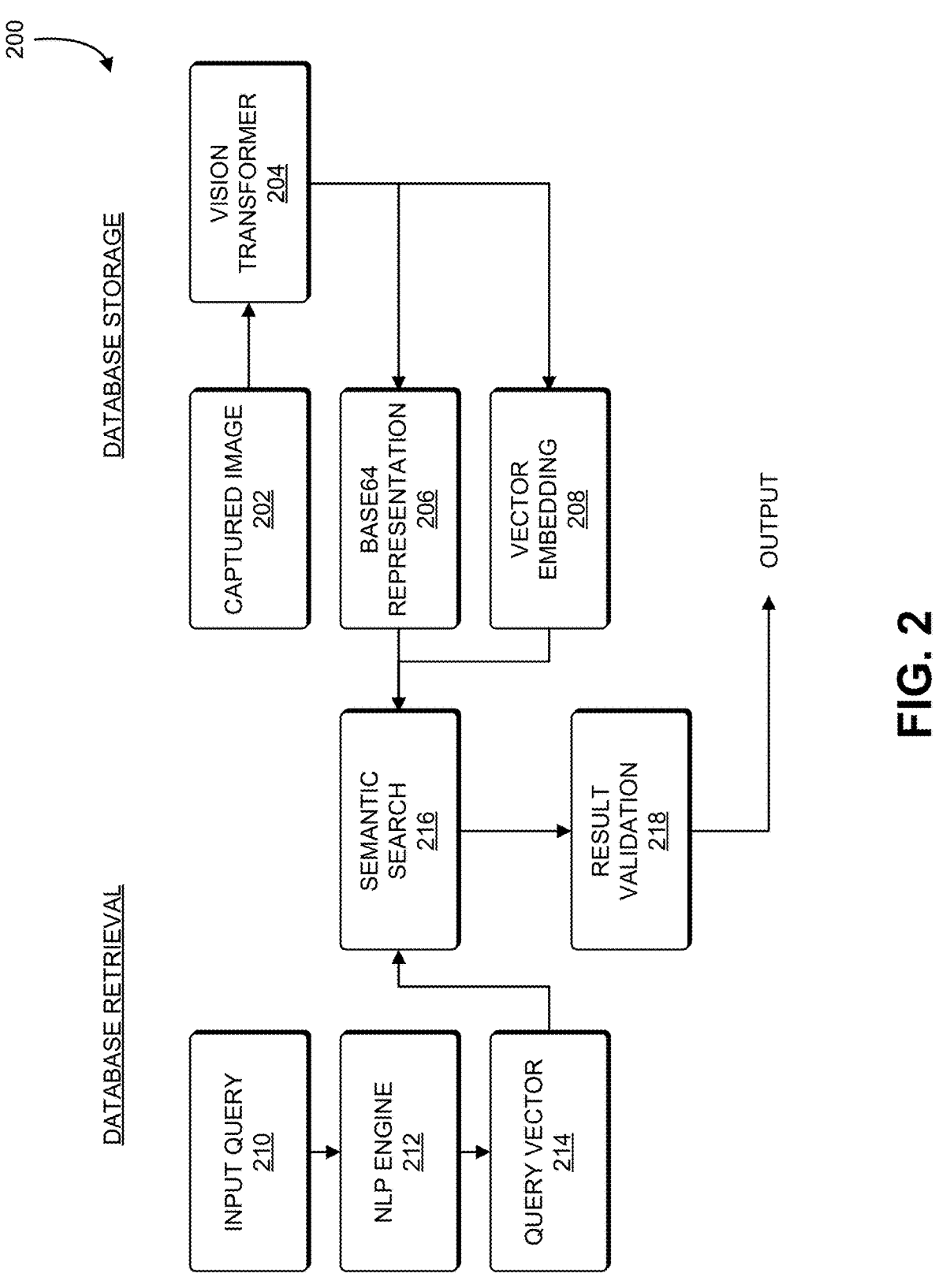
FIG. 2 illustrates an example of a workflow in using a contextual image retrieval system in accordance with an embodiment.

FIG. 2 illustrates an illustrates an example of a workflow 200 in using a database retrieval system (e.g., contextual image retrieval system 100) in accordance with an embodiment. As illustrated in FIG. 2, the workflow 200 may include both a process for storing information to a database (Database Storage) and a process for retrieving information from a database (Database Retrieval). For example, the process for database storage may include receiving a captured image 202, which is input to a vision transformer 204, whereupon the image are encoded into base64 representation 206 and a vector embedding 208 and stored in storage device (e.g., storage device(s) 130 of FIG. 1). The process for database retrieval may include receiving an input query 210, which may be converted by NLP engine 212 into a query vector 214, which may be used to perform semantic search 216 to result in result validation 218. In one embodiment, database retrieval and database storage may be performed asynchronously, concurrently, and/or sequentially and may be in response to a manual request or an automatic trigger (e.g., detection of a new image from an image capture agent.)

In at least one example embodiment, performing workflow 200 enables a system (e.g., contextual image retrieval system 100) to receiving one or more images captured in real-time; generating, using one or more first machine learning (ML) models, one or more embedded vectors representing content of the one or more images in numerical form; recording the one or more images and the one or more embedded vectors in one or more databases; receiving an input query requesting retrieval of at least one image of the one or more images; identifying a similarity between the input query and the at least one image based, at least in part, the one or more embedded vectors; and outputting the at least one images based, at least in part, on the similarity.

In an example embodiment, performing workflow 200 causes a system (e.g., contextual image retrieval system 100) to retrieve text, images, and/or data from a database (e.g., storage device(s) 130, embedding database 132, and/or image database 134.)

To retrieve a desired entry stored in a database, a user may submit an input query 210 to a computing system. Input query 210 may be written in a plain language format that requests for a specific result or group of results. For example, a user may request to "Find all images of golden retrievers from last week near a hospital with patient ID #98765." A processor of a computing system (e.g., processing device 120) may receive the input query and use an NLP engine 212, such as a large language model or transformer model with self-attention, to extract and identify the semantic content of the input query.

The NLP engine 212 converts the input query into a query vector 214 representing the semantic content of each word or token of the input query weighted by its identified importance. A processor then performs semantic search 216 comparing the query vector 214 to an embedded vector of an image and/or an encoded representation (e.g., a base64 representation) of the embedded vector the image, using cosine similarity, approximate nearest neighbor, dot product, Euclidean distance, Manhattan distance, Jaccard similarity, and/or other vector search or comparison techniques.

The semantic search 216 may return a number of possible candidate results in response to input query 210. These candidate results are ranked according to their similarity identified by the comparison of the image encoded vectors or embeddings to the query vector 214, the relevance of the context, and business rules or filters defined by the user.

A processor then performs result validation 218 to identify or validate that the candidate results of the semantic search 216 are proper results to the input query 210. The processor extracts metadata corresponding to the candidate results (e.g., timestamps, transaction IDs, geolocation) and identifies content of the candidate image result using Optical Character Recognition (OCR), object detection, feature matching, and/or other content identification techniques. The extracted metadata and identified content is then compared to the user query using the appropriate corresponding vectors. The validation process ensures that images meet the input query specified and correctly reflect parameters set by the user. A validated result is then output to the user as a result or solution to the input query 210.

To store a desired entry into a database, a user or software application may submit a captured image 202 obtained by an image capture agent (e.g., image capture agents 110 of FIG. 1) to the system that performs database storage (e.g., processing device 120 of FIG. 1) process to be stored. The system may input captured image 202 to a machine learning model, such as a vision transformer 204, to tokenize the image and perform vector embedding 208 on the tokens using a machine learning model (e.g., machine learning engines 126). The system may further encode tokens into base64 representations 206 of the captured images using the same or an additional machine learning model. The machine learning model may be software that is performed using one or more circuits that form part of a larger system (e.g., an integrated circuit (IC), system on-chip (SoC), central processing unit (CPU), graphics processing unit (GPU), data processing unit (DPU), etc.). Hardware to store and/or execute for the machine learning model may include hard-wired circuits, programmable circuits, state machine circuits, fixed function circuits, execution unit circuits, firmware with stored instructions executed by programmable circuits, or some combination thereof.

The system performing the database storage process may then store captured image 202, vector embedding 208, and/or base64 representation 206 in a central repository of a storage device (e.g., storage device(s) 130 of FIG. 1) for future retrieval. When a semantic search 216 is performed, the system performing the database retrieval process may retrieve captured image 202, vector embedding 208, and/or base64 representation 206 from the storage device for comparison to the input query as described previously.

Contextual image workflow 200 may be performed by a system, such as contextual image retrieval system 100, comprising a computing device, such as computing device 1100 or any suitable device. In at least one embodiment, workflow 200 can be at least partially performed by a processor of contextual image retrieval system 100 and at least partially performs processes described with reference to FIG. 2-11. In at least one embodiment, performing workflow 200 enables a computing system to receive one or more images captured in real-time by autonomous image capture agents deployed to various locations across a distributed computing system; generate one or more vectors that embed one or more base64 representations of the one or more images, the one or more vectors representing semantic content of the one or more images in numerical form; generate one or more natural language descriptions of one or more objects in the one or more images; and record, in a vector database, the one or more vectors with the one or more natural language descriptions of the one or more images.

A computer system that implements contextual image workflow 200 may significantly improve processes for digital forensics, regulatory compliance, and/or anomaly identification. For example, a computing device may capture screenshots of user workstations and saves the screenshots to a database. An administrator may then be able to use a natural language input query to quickly retrieve image-based evidence to identify whether proper protocols for certain interactions were followed. For example, an administrator may input a request such as "Retrieve images from last Thursday that show EmployeeID 123 using System ABC." From the images, the administrator may then identify problems or anomalies at a user level or may submit images to government regulators or other authorities to indicate compliance with regulations or to provide digital evidence.

Figure 3:
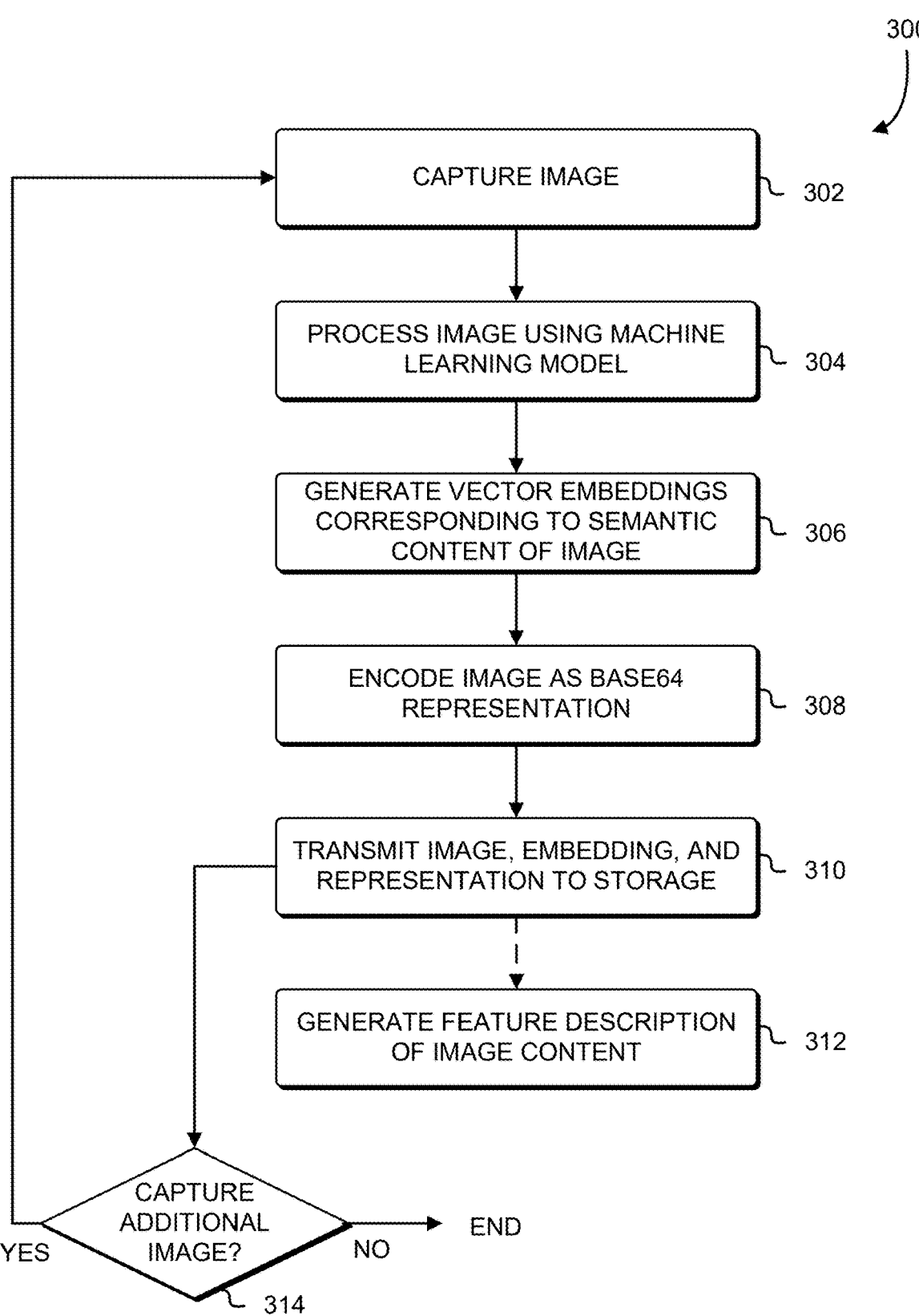
FIG. 3 is a flowchart that illustrates an example of storing data captured in a contextual image retrieval system in accordance with an embodiment.

FIG. 3 is a flowchart that illustrates an example of a process 300 for storage of captured data in computing system (e.g., contextual image retrieval system 100) in accordance with an embodiment. In an example embodiment, a processor, such as processing device 120 of FIG. 1, performs process 300 to at least partially receive one or more images captured in real-time by autonomous image capture agents deployed to various locations across a distributed computing system; generate, using one or more first machine learning (ML) models, one or more vectors that embed one or more base64 representations of the one or more images, the one or more vectors representing semantic content of the one or more images in numerical form; generate, by providing the one or more images to one or more second ML models, one or more natural language descriptions of one or more objects in the one or more images; and record, in a vector database, the one or more vectors with the one or more natural language descriptions of the one or more images.

At 302, one or more processors performing the process 300 may receive an image captured by an image capture agent (e.g., image capture agent 110 of FIG. 1) in real time, such as by using a digital camera to capture an image of scene or by obtaining a screenshot of a current display. The image capture operation may be triggered manually by a user or may be obtained automatically through software or automated service that triggers when a condition is satisfied. For example, a screenshot of a current window may be captured when a user performs an operation that is outside of normal daily activity (e.g., login from an unknown location or device, performing an action outside of normal work scope, etc.).

At 304, one or more processors (e.g., processing device 120 of FIG. 1) performing the process 300 may process the image using a machine learning model. A plurality of machine learning models (e.g., machine learning engines 126) may be stored at the processing device and made available for use by the processor. The one or more processors may select one of the plurality of machine learning models to process the image captured at 302. For example, the one or more processors may user a vision transformer to divide the image into patches and convert the patches into tokens.

At 306, one or more processors (e.g., using vector embedding unit 122 of processing device 120 in FIG. 1) performing the process 300 may generate data that is representative of the captured images in a continuous vector space. For example, vector embedding unit 122 may divide the images into discrete patches or tokens and convert the patches or tokens into numerical vectors. Each vector encodes semantic information or properties relative to the images that can be used for later retrieval.

At 308, one or more processors (e.g., using format conversion unit 124 of processing device 120 in FIG. 1) performing the process 300 may convert the numerical vectors generated at 306 into a different format, such as base64. For example, format conversion unit 124 may encode the numerical vectors from vector embedding unit 122 into a base64 or other database-friendly format.

At 310, one or more processors (e.g., using format conversion unit 124 of processing device 120 in FIG. 1) performing the process 300 may transmit the image, vector embedding, and/or encoded representation to a storage device or database (e.g., storage device(s) 130 of FIG. 1). The one or more processors may store the image may be in a first storage space, such as an image database, and may store the encoded representations or embedded vectors in a vector database. The system (e.g., contextual image retrieval system 100) may store and index the vector representations or embeddings to facilitate fast and efficient similarity searches. The system may further continuously update the storage or database repository as new images are captured by agents, allowing for dynamic retrieval and validation.

At 312, one or more processors (e.g., using format conversion unit 124 of processing device 120 in FIG. 1) performing the process 300 may optionally generate a plain language feature description of content in the image captured at 302. Using a machine learning model, the processor may identify objects, read text, or provide contextual information for the content in the image. For example, in a screenshot of a window in a display, a plain language description would indicate that "The image shows a screenshot of a window named "Example Company" with a top menu showing "file," "edit," "print," and "review." The window shows a transaction for client "A" to move inventory to location 2." This plain language feature description may additionally be stored in a database of a storage device for future retrieval and validation.

At 314, if additional images are captured by the image capture agents (YES at 314), then one or more processors performing the process 300 may return to 302 and repeat the operations of 302-314. If no additional images have been or are to be captured (NO at 314), then process 300 ends.

Some or all of processes of described herein (or any other processes described, or variations and/or combinations of those processes) may be performed under control of one or more computer systems configured with executable instructions and/or other data and may be implemented as executable instructions executing collectively on processing device 120 or a combination of a plurality of processing devices 120. In at least one embodiment, executable instructions and/or other data may be stored on a non-transitory computer-readable storage medium (e.g., a computer program persistently stored on magnetic, optical, or flash media).

In at least one embodiment, logic and/or processes of FIG. 3 can be integrated into systems, processors, and structures disclosed in FIGS. 1-2 and 4-10. For example, logic/hardware structures from FIG. 1 or 11 can perform at least part or all of processes or APIs 600, 700, 800, and/or 900. Note that one or more of the operations performed in 302-314 may be performed in various orders and combinations, including in parallel.

FIG. 4 is a flowchart that illustrates an example of a process 400 for contextual image data retrieval in a computing system (e.g., contextual image retrieval system 100) in accordance with an embodiment. In an example embodiment, a processor, such as processing device 120 of FIG. 1, performs process 400 to at least partially receive one or more input query requests; generate, using one or more third ML models, one or more vector representations corresponding to the one or more input query requests; and retrieve a result to the one or more input query requests based, at least in part, on a similarity between the one or more vector representations and at least one of the one or more base64 representations or the one or more vectors representing semantic content.

At 402, one or more processors performing the process 400 may receive (e.g., from a user via user device 140 of FIG. 1) an input query for retrieval of an image or of data stored in a database (e.g., storage device(s) 130 of FIG. 1). The input query is a natural language input query requesting retrieval of one or more images that satisfy a user-defined criterion. The user input query is transmitted from the user device to a processing device (e.g., processing device 120) to process the input query.

At 404, one or more processors performing the process 400 (e.g., processing device 120) may parse the input query received using a machine learning model, such as a large language model, natural language processing engine, or transformer neural network. For example, a large language model may break down the text of the input query into smaller tokens. The tokens may be as small as a single character or as large as a word, depending on the design of the machine learning model being used. The tokens may also be portions of words, or sub-words, in order to process complex terms that may not have been known by the machine learning model at time of input.

At 406, one or more processors performing the process 400 may use the machine learning model to convert the input query into a semantic vector representing the semantic content of each word or token of the input query weighted by its identified importance. After the input query has been tokenized at 404, each token may be converted into a numerical semantic vector through an embedding layer. These semantic vectors may capture semantic information about the tokens in order for the model to understand the context of the natural language query. From there, the one or more processors may apply a weighting to the sematic vectors to generate an importance of each token relative to every other token in the sequence in order to identify the most relevant portions of the input query and determine what images or types of images should be retrieved as a response to the input query.

At 408, one or more processors performing the process 400 may then perform a semantic search comparing the semantic vector to an embedded vector of an image and/or an encoded representation (e.g., a base64 representation) of the embedded vector the image, using cosine similarity, approximate nearest neighbor, dot product, Euclidean distance, Manhattan distance, Jaccard similarity, and/or other vector search or comparison techniques. Based on results of the search, the one or more processors may identify one or more matching results, which are then validated for accuracy. Further description of this operation follows with respect to FIG. 5.

At 410, one or more processors performing the process 400 may then output to the user (e.g., via the user device 140) the results of the semantic search. For example, the one or more processors may return the results identified and validated at 408 as having been identified as accurate responses to the input query from 402.

Some or all of processes of described herein (or any other processes described, or variations and/or combinations of those processes) may be performed under control of one or more computer systems configured with executable instructions and/or other data and may be implemented as executable instructions executing collectively on processing device 120 or a combination of a plurality of processing devices 120. In at least one embodiment, executable instructions and/or other data may be stored on a non-transitory computer-readable storage medium (e.g., a computer program persistently stored on magnetic, optical, or flash media).

In at least one embodiment, logic and/or processes of FIG. 4 can be integrated into systems, processors, and structures disclosed in FIGS. 1-3 and 5-10. For example, logic/hardware structures from FIG. 1 or 11 can perform at least part or all of processes or APIs 600, 700, 800, and/or 900. Note that one or more of the operations performed in 402-410 may be performed in various orders and combinations, including in parallel.

FIG. 5 is a flowchart that illustrates an example of a semantic search and process 500 for validation in a computing system (e.g., contextual image retrieval system 100) in accordance with an embodiment. In an example embodiment, a processor, such as processing device 120 of FIG. 1, performs semantic search and process 500 to at least partially identify a similarity between an input query and at least one image based, at least in part, one or more embedded vectors or metadata; and outputting the at least one images based, at least in part, on the similarity. In an example embodiment, process 500 corresponds to 408 of FIG. 4, and process 500 is completed before process 400 continues to 410.

At 502, one or more processors performing the process 500 (e.g., processing device 120) may retrieve stored vector embeddings and/or base64 representations corresponding to the images stored in a storage device. The vector embeddings and/or base64 representations may be stored in a vector database for high speed retrieval.

At 504, one or more processors performing the process 500 (e.g., processing device 120) may compare the semantic vector of an input query (e.g., generated at 406 of FIG. 4) to the vector embeddings retrieved at 502. The query vector is compared with image vectors using cosine similarity, approximate nearest neighbor, or other search techniques disclosed herein. If a vector corresponding to an image has a high similarity with the semantic vector of the input query, a processor identifies the image as being a potential result to the query.

At 506, one or more processors performing the process 500 may rank the potential results generated at 504 based on the level of similarity or a similarity score. Retrieved image results may be ranked not only according to their similarity to the query, but also by the relevance of the context, or business rules or filters defined by the user.

At 508, one or more processors performing the process 500 may additionally extract metadata stored in the database corresponding to the image, including feature descriptions (if previously generated at 312 of FIG. 3), image timestamps, image geolocation data, transaction IDs, and/or other types of metadata generated for the captured image. In an example embodiment, the metadata may be extracted only for results with a corresponding level of similarity or for top ranked results. In another embodiment, the metadata may be saved in a separate database that can be readily accessed for the corresponding image in the image database.

At 510, one or more processors performing the process 500 may then perform a natural language feature description of the highest ranked results. If the feature description for the retrieved images was previously retrieved (e.g., at 312 of FIG. 3), this operation may be omitted in process 500. Otherwise, this operation may be performed in a similar manner as described with respect to 312 of FIG. 3.

At 512, one or more processors performing the process 500 may then validates the retrieved result as being a valid response to the input query based on the metadata and the feature description information retrieved at 508 and 510.

Using Optical Character Recognition (OCR), object detection, and feature matching, the system verifies that the image content aligns with the specified query parameters (e.g., verifying the presence of a specific object in an image). In the event that an image does not satisfy the input query, an alert may be transmitted to the user or may be omitted from the results. In the event that an image does satisfy the input query, then the image may be returned as a valid result.

Some or all of processes of described herein (or any other processes described, or variations and/or combinations of those processes) may be performed under control of one or more computer systems configured with executable instructions and/or other data and may be implemented as executable instructions executing collectively on processing device 120 or a combination of a plurality of processing devices 120. In at least one embodiment, executable instructions and/or other data may be stored on a non-transitory computer-readable storage medium (e.g., a computer program persistently stored on magnetic, optical, or flash media).

In at least one embodiment, logic and/or processes of FIG. 5 can be integrated into systems, processors, and structures disclosed in FIGS. 1-4 and 6-10. For example, logic/hardware structures from FIG. 1 or 11 can perform at least part or all of processes or APIs 600, 700, 800, and/or 900. Note that one or more of the operations performed in 502-512 may be performed in various orders and combinations, including in parallel.

FIG. 6 illustrates a block diagram of an application programming interface (API) that includes an instruction call and an instruction response to attach an image for semantic processing, in accordance with at least one embodiment. In at least one embodiment, API 600 may be called to capture an image or retrieve an existing image so that it may be stored in a database repository or may be evaluated for a similarity to another object.

In at least one embodiment, one or more processors perform one or more operations of API 600. In at least one embodiment, processors that perform one or more operations of API 600 are any one processor, or combination of processors, described herein, including processing device 120 of FIG. 1 or processors 1102 of FIG. 11. In an example embodiment, two or more processor(s) that perform operations of API 600 are installed on different computing machines (e.g., servers), different server racks, different data centers, or some combination thereof. Processor(s) used to perform an operation of API 600 may receive one or more images captured in real-time by autonomous image capture agents deployed to various locations across a distributed computing system. In at least one embodiment, processor(s) used to perform an operation of API is used in conjunction with processes or structures described in conjunction with FIGS. 1-5 and FIG. 11, may perform instructions or application program interface (API) functions described with reference to FIG. 7-10 or may be utilized by any suitable system.

A processor performing API 600 may call the attach image instruction 602 to receive an image through a new real-time image capture or from a previously saved image capture. The processor may set that image capture as an image that will be processed by a system to perform a specific task, such as contextual image retrieval system 100. If the image is successfully loaded for processing, then the attach image response instruction 604 may return an indication of success. If the image is not successfully loaded, then the attach image response instruction 604 may return an indication of failure, identifying to the user that the process may proceed again.

Some or all of processes of described herein (or any other processes described, or variations and/or combinations of those processes) may be performed under control of one or more computer systems configured with executable instructions and/or other data and may be implemented as executable instructions executing collectively on processing device 120 or a combination of a plurality of processing devices 120. In at least one embodiment, executable instructions and/or other data may be stored on a non-transitory computer-readable storage medium (e.g., a computer program persistently stored on magnetic, optical, or flash media).

In at least one embodiment, logic and/or processes of FIG. 6 can be integrated into systems, processors, and structures disclosed in FIGS. 1-5 and 7-10. For example, logic/hardware structures from FIG. 1 can perform at least part or all of processes or APIs 600, 700, 800, and/or 900.

FIG. 7 illustrates a block diagram of an application programming interface (API) that includes an instruction call and an instruction response to encode a captured image into a vector with a specific format, in accordance with at least one embodiment. In at least one embodiment, API 700 may be called to convert an image designated for processing into an embedded vector and convert the vector to a desired encoding format.

In at least one embodiment, one or more processors perform one or more operations of API 700. In at least one embodiment, processors that perform one or more operations of API 700 are any one processor, or combination of processors, described herein, including processing device 120 of FIG. 1 or processors 1102 of FIG. 11. In an example embodiment, two or more processor(s) that perform operations of API 700 are installed on different computing machines (e.g., servers), different server racks, different data centers, or some combination thereof. Processor(s) used to perform an operation of API 700 may generate, using one or more first machine learning (ML) models, one or more vectors that embed one or more base64 representations of the one or more images, the one or more vectors representing semantic content of the one or more images in numerical form. In at least one embodiment, processor(s) used to perform an operation of API 700 is used in conjunction with processes or structures described in conjunction with FIGS. 1 and 11, may perform instructions or application program interface (API) functions described with reference to FIG. 6-10 or may be utilized by any suitable system.

A processor performing API 700 may call the encode image vector instruction 702 to receives an image set (e.g., through instruction 600) to be processed and an encoding format in which the image may be encoded. The processor may perform a machine learning model (e.g., a vision transformer) to convert the image into tokens and generate vector embedding corresponding to the tokens. Then the vector embedding may be converted into a format (e.g., base64) identified by the API input. If the image is successfully encoded for processing, then the encode image vector response instruction 704 may return the encoded vector. If the image is not successfully encoded, then the encode image vector response instruction 704 may return an indication of failure.

Some or all of processes of described herein (or any other processes described, or variations and/or combinations of those processes) may be performed under control of one or more computer systems configured with executable instructions and/or other data and may be implemented as executable instructions executing collectively on processing device 120 or a combination of a plurality of processing devices 120 or processors 1102. In at least one embodiment, executable instructions and/or other data may be stored on a non-transitory computer-readable storage medium (e.g., a computer program persistently stored on magnetic, optical, or flash media).

In at least one embodiment, logic and/or processes of FIG. 7 can be integrated into systems, processors, and structures disclosed in FIGS. 1-6 and 8-10. For example, logic/hardware structures from FIG. 1 can perform at least part or all of processes or APIs 600, 700, 800, and/or 900.

FIG. 8 illustrates a block diagram of an application programming interface (API) that includes an instruction call and an instruction response to identify context and content of images, in accordance with at least one embodiment. In at least one embodiment, API 800 may be called to identify semantic content of objects in images and generate plain language description of image contents.

In at least one embodiment, one or more processors perform one or more operations of API 800. In at least one embodiment, processors that perform one or more operations of API 800 are any one processor, or combination of processors, described herein, including processing device 120 of FIG. 1 or processors 1102 of FIG. 11. In an example embodiment, two or more processor(s) that perform operations of API 800 are installed on different computing machines (e.g., servers), different server racks, different data centers, or some combination thereof. Processor(s) used to perform an operation of API 800 may generate, by providing the one or more images to one or more second ML models, one or more natural language descriptions of one or more objects in the one or more images. In at least one embodiment, processor(s) used to perform an operation of API 800 is used in conjunction with processes or structures described in conjunction with FIGS. 1 and 11, may perform instructions or application program interface (API) functions described with reference to FIG. 6-10 or may be utilized by any suitable system.

A processor performing API 800 may call the contextual analysis instruction 802 to receives an encoded vector representation of an image (e.g., through API 700) to be processed, such as a base64 representation or an embedded vector of an image. The processor may perform a machine learning model (e.g., a vision transformer, object recognition network, etc.) to analyze and identify the objects or content of the image. Using Optical Character Recognition (OCR), object detection, and feature matching, the system identifies features of the image content. Then, a plain language description of the objects or text identified in the image is output to the user. If the image successfully identified the objects, text, or other contextual information from the image, then the contextual analysis response instruction 804 may return the plain language description of the identified content. If the image is not successfully identified, then the contextual analysis response instruction 804 may return an indication of failure.

Some or all of processes of described herein (or any other processes described, or variations and/or combinations of those processes) may be performed under control of one or more computer systems configured with executable instructions and/or other data and may be implemented as executable instructions executing collectively on processing device 120 or a combination of a plurality of processing devices 120. In at least one embodiment, executable instructions and/or other data may be stored on a non-transitory computer-readable storage medium (e.g., a computer program persistently stored on magnetic, optical, or flash media).

In at least one embodiment, logic and/or processes of FIG. 8 can be integrated into systems, processors, and structures disclosed in FIGS. 1-7 and 9-10. For example, logic/hardware structures from FIG. 1 can perform at least part or all of processes or APIs 600, 700, 800, and/or 900.

FIG. 9 illustrates a block diagram of an application programming interface (API) that includes an instruction call and an instruction response to perform a semantic search to identify an image or database response from an input query, in accordance with at least one embodiment. In at least one embodiment, API 900 may be called to identify semantic content of objects in images and generate plain language description of image contents.

In at least one embodiment, one or more processors perform one or more operations of API 900. In at least one embodiment, processors that perform one or more operations of API 900 are any one processor, or combination of processors, described herein, including processing device 120 of FIG. 1 or processors 1102 of FIG. 11. In an example embodiment, two or more processor(s) that perform operations of API 900 are installed on different computing machines (e.g., servers), different server racks, different data centers, or some combination thereof. Processor(s) used to perform an operation of API 900 may retrieve a result to the one or more input query requests based, at least in part, on a similarity between the one or more vector representations and at least one of the one or more base64 representations or the one or more vectors representing semantic content. In at least one embodiment, processor(s) used to perform an operation of API 900 is used in conjunction with processes or structures described in conjunction with FIGS. 1 and 11, may perform instructions or application program interface (API) functions described with reference to FIG. 6-10 or may be utilized by any suitable system.

A processor performing API 900 may call the semantic search instruction 902 to receives a natural language input query from a user that is converted to vector embedding (e.g., through a transformer neural network, large language model, or the like). The processor may perform a machine learning model (e.g., a vision transformer, object recognition network, etc.) to analyze the semantic content or context of the input query. Then, the identified vector embedding that correspond to the identified semantic context may be compared to one or more stored vector embeddings of images in a vector database. The input query vector may be compared with image vectors using cosine similarity, approximate nearest neighbor, or similar search techniques. The processor performing API 900 may retrieve the most relevant images based on similarity scores and contextual relevance to the query. If a similarity score exceeds a predetermined condition, such as exceeding a similarity threshold, then the semantic search response instruction 904 may return all of the identified results corresponding to the input query. The predetermined condition may be manually preset as a threshold by a user (e.g., output all results with similarity greater than 80%) or may be dynamically set as a condition by the system (e.g., output ten results with greatest similarity relative to other results.) If a result image is not successfully identified, then the semantic search response instruction 904 may return an indication of failure.

Some or all of processes of described herein (or any other processes described, or variations and/or combinations of those processes) may be performed under control of one or more computer systems configured with executable instructions and/or other data and may be implemented as executable instructions executing collectively on processing device 120 or a combination of a plurality of processing devices 120. In at least one embodiment, executable instructions and/or other data may be stored on a non-transitory computer-readable storage medium (e.g., a computer program persistently stored on magnetic, optical, or flash media).

In at least one embodiment, logic and/or processes of FIG. 9 can be integrated into systems, processors, and structures disclosed in FIGS. 1-8 and 10. For example, logic/hardware structures from FIG. 1 can perform at least part or all of processes or APIs 600, 700, 800, and/or 900.

FIG. 10 illustrates a block diagram of an application programming interface (API) that includes an instruction call and an instruction response to validate that an image retrieved in response to a semantic search (e.g., through API 900) accurately satisfies the initial input query, in accordance with at least one embodiment. In at least one embodiment, API 1000 may be called to identify semantic content of objects in images and generate plain language description of image contents.

In at least one embodiment, one or more processors perform one or more operations of API 1000. In at least one embodiment, processors that perform one or more operations of API 1000 are any one processor, or combination of processors, described herein, including processing device 120 of FIG. 1 or processors 1102 of FIG. 11. In an example embodiment, two or more processor(s) that perform operations of API 1000 are installed on different computing machines (e.g., servers), different server racks, different data centers, or some combination thereof. Processor(s) used to perform an operation of API 1000 may validate a result to one or more input query requests based, at least in part, on metadata corresponding to the one or more images retrieved in response to the input query request or validate a result to one or more input query requests based, at least in part, on an identification that text, object, or feature content included in the one or more images correctly corresponds to the one or more input queries. In at least one embodiment, processor(s) used to perform an operation of API 1000 is used in conjunction with processes or structures described in conjunction with FIGS. 1 and 11, may perform instructions or application program interface (API) functions described with reference to FIG. 6-10 or may be utilized by any suitable system.

A processor performing API 1000 may call the image validation instruction 1002 to receives an image that was retrieved in response to a semantic search and the natural language input query or vector embeddings corresponding to the input query. The processor may perform a machine learning model (e.g., content-based analysis network) to compare the semantic content of the input query to the semantic content of the retrieved result image. The processor may additionally extract metadata of the retrieved image and identify whether the metadata satisfies one or more criteria set by the user. Then, the processor may verify that the image content aligns with the specified query parameters (e.g., verifying the presence of a specific object in an image) based on the semantic content and the metadata retrieved from the image. The processer performing API 1000 may validate the at least one image retrieved as a valid result to the one or more natural language input query requests based, at least in part, on metadata corresponding to the at least one image or based, at least in part, on an identification that text, object, or feature content included in the at least one image. If image is identified to be an accurate response to the input query, then the image validation response instruction 1004 may return a value indicating that the response is accurate (e.g., true, 1, success, etc.). If a result image is not successfully identified as an accurate response to the input query, then the image validation response instruction 1004 may return an indication of failure.

Some or all of processes of described herein (or any other processes described, or variations and/or combinations of those processes) may be performed under control of one or more computer systems configured with executable instructions and/or other data and may be implemented as executable instructions executing collectively on processing device 120 or a combination of a plurality of processing devices 120. In at least one embodiment, executable instructions and/or other data may be stored on a non-transitory computer-readable storage medium (e.g., a computer program persistently stored on magnetic, optical, or flash media).

In at least one embodiment, logic and/or processes of FIG. 10 can be integrated into systems, processors, and structures disclosed in FIGS. 1-9. For example, logic/hardware structures from FIG. 1 can perform at least part or all of processes or APIs 600, 700, 800, and/or 900.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 11:
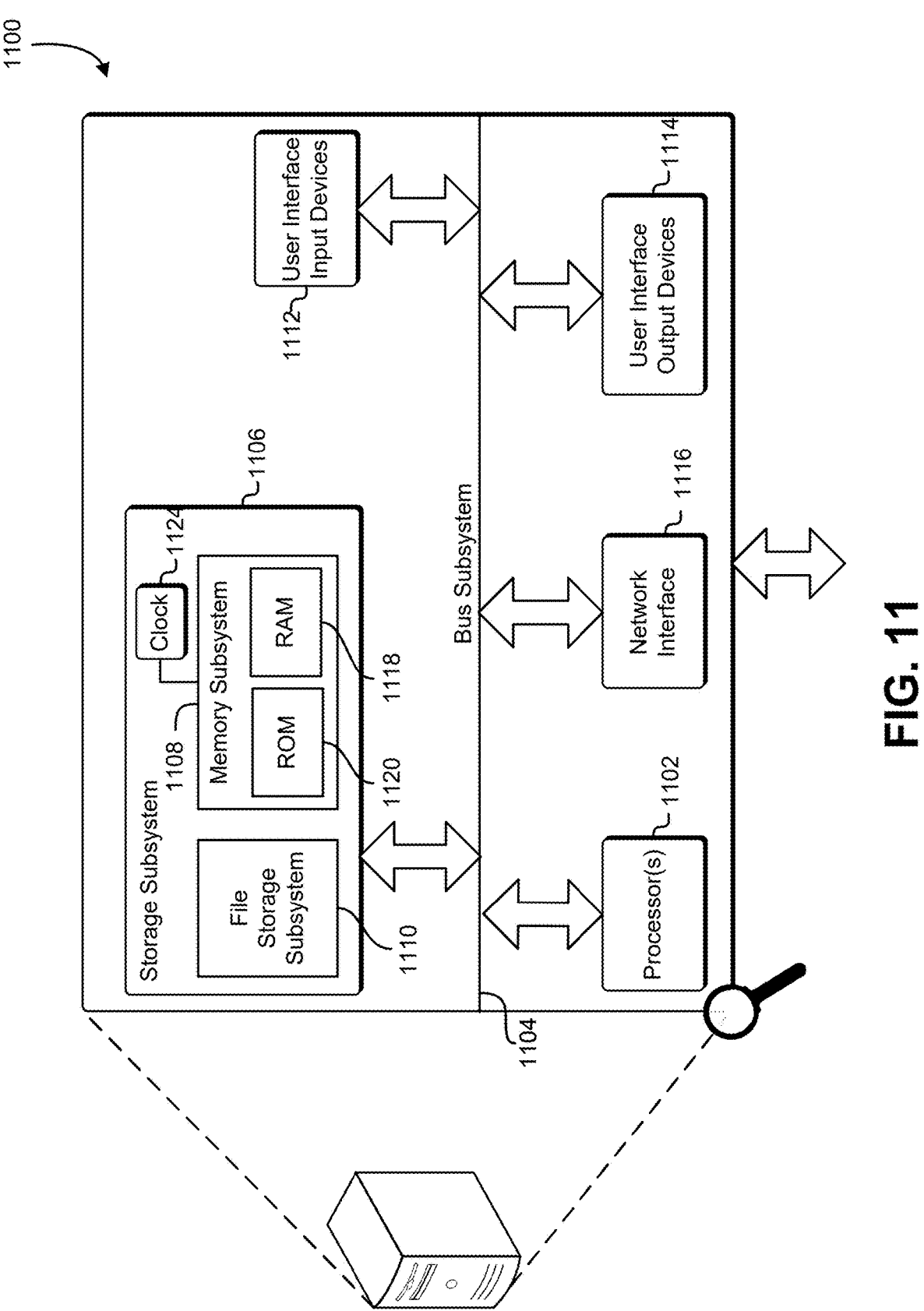
FIG. 11 illustrates a computing device that may be used in accordance with at least one embodiment of a contextual image retrieval system.

FIG. 11 is an illustrative, simplified block diagram of a computing device 1100 that can be used to practice at least one embodiment of the present disclosure. In various embodiments, the computing device 1100 includes any appropriate device operable to send and/or receive requests, messages, or information over an appropriate network and convey information back to a user of the device. The computing device 1100 may be used to implement any of the systems illustrated and described above. For example, the computing device 1100 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1100 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 11, the computing device 1100 may include one or more processors 1102 that, in embodiments, communicate with and are operatively coupled to a number of peripheral subsystems via a bus subsystem. In some embodiments, these peripheral subsystems include a storage subsystem 1106, comprising a memory subsystem 1108 and a file/disk storage subsystem 1110, one or more user interface input devices 1112, one or more user interface output devices 1114, and a network interface subsystem 1116. Such storage subsystem 1106 may be used for temporary or long-term storage of information.

In some embodiments, the bus subsystem 1104 may provide a mechanism for enabling the various components and subsystems of computing device 1100 to communicate with each other as intended. Although the bus subsystem 1104 is shown schematically as a single bus, alternative embodiments of the bus subsystem utilize multiple buses. The network interface subsystem 1116 may provide an interface to other computing devices and networks. The network interface subsystem 1116 may serve as an interface for receiving data from and transmitting data to other systems from the computing device 1100. In some embodiments, the bus subsystem 1104 is utilized for communicating data such as details, search terms, and so on. In an embodiment, the network interface subsystem 1116 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1116 is enabled by wired and/or wireless connections and combinations thereof.

In some embodiments, the user interface input devices 1112 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1100. In some embodiments, the one or more user interface output devices 1114 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1100. The one or more user interface output devices 1114 can be used, for example, to present user interfaces to facilitate user interaction with applications performing processes described and variations therein, when such interaction may be appropriate.

In some embodiments, the storage subsystem 1106 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1106. These application modules or instructions can be executed by the one or more processors 1102. In various embodiments, the storage subsystem 1106 additionally provides a repository for storing data used in accordance with the present disclosure. In some embodiments, the storage subsystem 1106 comprises a memory subsystem 1108 and a file/disk storage subsystem 1110.

In embodiments, the memory subsystem 1108 includes a number of memories, such as a main random-access memory (RAM) 1118 for storage of instructions and data during program execution and/or a read only memory (ROM) 1120, in which fixed instructions can be stored. In some embodiments, the file/disk storage subsystem 1110 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1100 includes at least one local clock 1124. The at least one local clock 1124, in some embodiments, is a counter that represents the number of ticks that have transpired from a particular starting date and, in some embodiments, is located integrally within the computing device 1100. In various embodiments, the at least one local clock 1124 is used to synchronize data transfers in the processors for the computing device 1100 and the subsystems included therein at specific clock pulses and can be used to coordinate synchronous operations between the computing device 1100 and other systems in a data center. In another embodiment, the local clock is a programmable interval timer.

The computing device 1100 could be of any of a variety of types, including a portable computer device, tablet computer, a workstation, or any other device described below. Additionally, the computing device 1100 can include another device that, in some embodiments, can be connected to the computing device 1100 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1100 for processing. Due to the ever-changing nature of computers and networks, the description of the computing device 1100 depicted in FIG. 11 is intended only as a specific example for purposes of illustrating the preferred embodiment of the device. Many other configurations having more or fewer components than the system depicted in FIG. 11 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1100 may include any appropriate hardware, software, and firmware for integrating with a data store as needed to execute aspects of one or more applications for the computing device 1100 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1100 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1100 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1100 may provide the content in one or more forms including, but not limited to, forms that are perceptible to the user audibly, visually, and/or through other senses. The handling of requests and responses, as well as the delivery of content, in an embodiment, is handled by the computing device 1100 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1100 typically will include an operating system that provides executable program instructions for the general administration and operation of the computing device 1100 and includes a computer-readable storage medium (e.g., a hard disk, random access memory (RAM), read only memory (ROM), etc.) storing instructions that if executed (e.g., as a result of being executed) by a processor of the computing device 1100 cause or otherwise allow the computing device 1100 to perform its intended functions (e.g., the functions are performed as a result of one or more processors of the computing device 1100 executing instructions stored on a computer-readable storage medium).

In an embodiment, the computing device 1100 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 1100 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 1100 is capable of storing, retrieving, and accessing structured or unstructured data. In an embodiment, computing device 1100 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate, and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:

one or more processors; and one or more non-transitory computer-readable mediums comprising computer-executable instructions that, if executed by the one or more processors, cause the system to at least:

receive one or more images captured in real-time by one or more autonomous image capture agents deployed to various locations across a distributed computing system;

generate, using one or more first machine learning (ML) models, one or more vectors that embed one or more base64 representations of the one or more images, the one or more vectors representing semantic content of the one or more images in numerical form;

generate, by providing the one or more images to one or more second ML models, one or more natural language descriptions of one or more objects in the one or more images;

record, in a vector database, the one or more vectors with the one or more natural language descriptions of the one or more images; and retrieve, in response to an input query from a computing device, at least a portion of the one or more images based, at least in part, on a search parameter corresponding to the input query and a comparison between a vectorized representation of the input query and the one or more vectors.

2. The system of claim 1, wherein the one or more first ML models or the one or more second ML models comprises at least one of:

25 a vision transformer model,
a language-image model, or
a self-supervised vision model.

3. The system of claim 1, wherein the one or more second ML models comprises at least one of:
a large language model (LLM),
a natural language processing (NLP) engine, or
a transformer neural network.

4. The system of claim 1, wherein the one or more autonomous image capture agents comprises software that causes one or more image capture devices to capture the one or more images, and wherein the one or more image capture devices comprise at least one of:
a digital camera,
a computing device capable of capturing screenshots, or
a mobile device comprising an image sensor.

5. The system of claim 1, wherein the computer-executable instructions further include instructions that cause the system to:
receive one or more input query requests;
generate, using one or more third ML models, one or more vector representations corresponding to the one or more input query requests; and
retrieve a result to the one or more input query requests based, at least in part, on a similarity between the one or more vector representations and at least one of the one or more base64 representations or the one or more vector representations representing the semantic content.

6. The system of claim 1, wherein the computer-executable instructions further include instructions that cause the system to validate a result to one or more input query requests based, at least in part, on metadata corresponding to the one or more images retrieved in response to the input query requests.

7. The system of claim 1, wherein the computer-executable instructions further include instructions that cause the system to validate a result to one or more input query requests based, at least in part, on an identification that text, object, or feature content included in the one or more images correctly corresponds to the one or more input query requests.

8. The system of claim 1, wherein the computer-executable instructions that cause the system to:
record the one or more images in an image database; and
index the one or more images to correspond to the one or more vectors and the one or more natural language descriptions in the vector database.

9. A computer-implemented method comprising:
obtaining, from a software agent deployed to a distributed computing device, an image by the software agent;
converting, using a machine learning (ML) model, the image into an embedding representing content of the image;
recording the image and the embedding in one or more repositories that contains images and embeddings;
obtaining a query requesting retrieval of the image from the one or more repositories;
converting the query to a vectorized input query that specifies search parameters;
performing, using one or more search parameters indicated in the query, a semantic similarity search based, at least in part, on a comparison between the vectorized input query and the embeddings in the one or more repositories; and
outputting the image based, at least in part, on the semantic similarity search.

10. The computer-implemented method of claim 9, wherein:
the computer-implemented method further comprises encoding the image into base64 to produce an encoded image; and
recording the image includes recording the encoded image in the one or more repositories.

11. The computer-implemented method of claim 9, wherein performing the semantic similarity search further comprises:
converting the query to a vector; and
computing similarity scores based, at least in part, on comparisons of the vector with the embeddings.

12. The computer-implemented method of claim 9, wherein outputting the image is further based, at least in part, on validating whether the image satisfies the query based, at least in part, on metadata or content of the image.

13. A non-transitory computer-readable storage medium having stored thereon executable instructions that, if executed by one or more processors of a computer system, cause the computer system to at least:
obtain a plurality of images captured in real-time by a plurality of autonomous image capture agents deployed to a plurality of locations across a distributed computing system;
generate one or more vectors that embed one or more base64 representations of the plurality of images, the one or more vectors representing semantic content of the plurality of images in numerical form;
generate one or more natural language descriptions of one or more objects in the plurality of images; and
record, in a vector database, the one or more vectors with the one or more natural language descriptions of the plurality of images; and
retrieve, in response to an input query from a computing device, at least a portion of the plurality of images based, at least in part, on a search parameter corresponding to the input query and a comparison between a vectorized representation of the input query and the one or more vectors.

14. The non-transitory computer-readable storage medium of claim 13, wherein the executable instructions further include instructions that cause the computer system to:
receive a natural language query;
generate a vector representation corresponding to the natural language query; and
retrieve a result to the natural language query based, at least in part, on a similarity between the vector representation and at least one of the one or more base64 representations or the one or more vectors representing the semantic content.

15. The non-transitory computer-readable storage medium of claim 13, wherein the executable instructions further include instructions that cause the computer system to:
receive a natural language query to retrieve an image of the plurality of images; and
validate the image retrieved as being a valid result to the natural language query based, at least in part, on metadata corresponding to the image.

16. The non-transitory computer-readable storage medium of claim 13, wherein the executable instructions that cause the computer system to:
receive a natural language query to retrieve an image of the plurality of images; and validate the image retrieved as being a valid result to the natural language query based, at least in part, on an identification of text, object, or feature content included in the image.

17. The non-transitory computer-readable storage medium of claim 13, wherein the executable instructions further include instructions that cause the computer system to:

record the plurality of images in an image database; and index the plurality of images to correspond to the one or more vectors and the one or more natural language descriptions in the vector database.

18. The non-transitory computer-readable storage medium of claim 13, wherein the executable instructions further cause the computer system to use one or more machine learning models to:

generate the one or more vectors, or generate the one or more natural language descriptions.

19. The non-transitory computer-readable storage medium of claim 13, wherein the executable instructions further cause the computer system to:

identify a relevance between an image of the plurality of images and a query based, at least in part, on one or more machine learning models identifying a similarity between the query and the one or more natural language descriptions corresponding to the image; and retrieve the image from one or more databases in response to the query based, at least in part on, the relevance.

20. The non-transitory computer-readable storage medium of claim 13, wherein the executable instructions further cause the computer system to validate a result to one or more input query requests based, at least in part, on an identification that text, object, or feature content included in the plurality of images correctly corresponds to the one or more input query requests.

* * * * *